D. F. VAUGHAN.
SPOOL.
APPLICATION FILED DEC. 22, 1920.

1,396,481.

Patented Nov. 8, 1921.

INVENTOR:
David F. Vaughan
BY
ATTORNEY

UNITED STATES PATENT OFFICE.

DAVID F. VAUGHAN, OF RIVERTON, NEW JERSEY.

SPOOL.

1,396,481.  Specification of Letters Patent.  Patented Nov. 8, 1921.

Application filed December 22, 1920. Serial No. 432,541.

*To all whom it may concern:*

Be it known that I, DAVID F. VAUGHAN, a citizen of the United States, residing at Riverton, in the county of Burlington and State of New Jersey, have invented certain new and useful Improvements in Spools, of which the following is a specification.

This invention relates to improvements in spools for use in fishing reels and for other uses.

Fishing reel and other spools have been objectionable because the end flanges have been of a construction which has permitted the line or thread being wound upon the spool to pile up in single layers upon or outwardly of each other against one or both flanges and subsequently collapsing or toppling over and resulting in a number of loose coils on the spool which become crossed and tangle the line.

The object of the invention is to overcome the aforesaid objection, and this object is accomplished by the provision of a spool having end flanges whose inner or opposing faces are constructed in a novel manner to prevent the tangling of the line or thread as above set forth.

With this object in view, the invention consists in the novel construction, combination and arrangement of parts hereinafter described and claimed.

In the accompanying drawings illustrating my invention,

Figure 1:
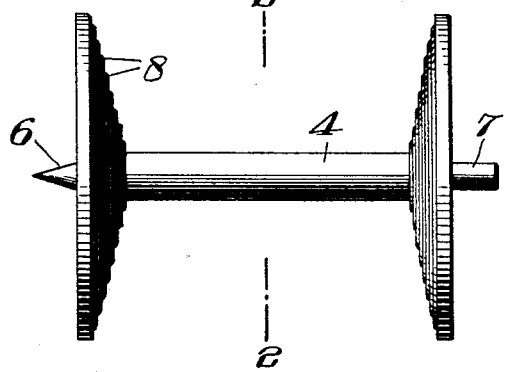
Figure 1 is a side view of a spool embodying my invention.
Figure 2:
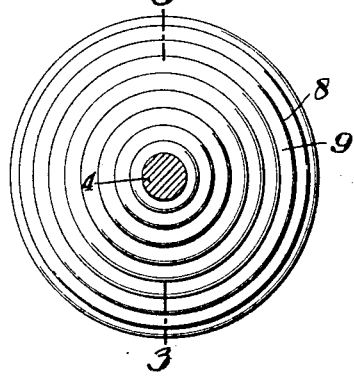
Fig. 2 is a transverse section thereof, on line 2—2 of Fig. 1.
Figure 3:
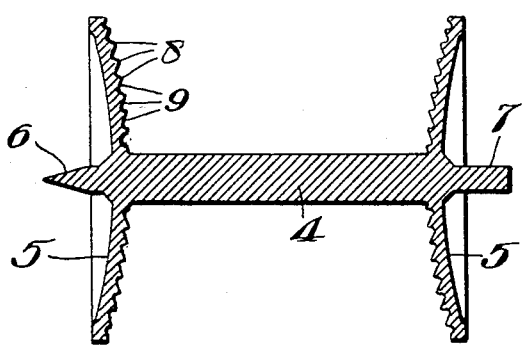
Fig. 3 is a longitudinal section thereof, on line 3—3 of Fig. 2.
Figure 5:
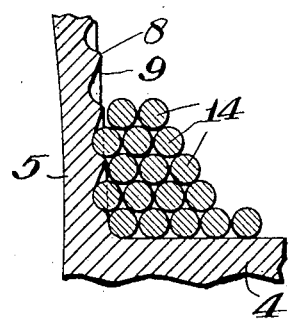
Fig. 5 is an enlarged view of a part of Fig. 4.

Referring to the drawings, the spool comprises the cylindrical body portion 4 and the end flanges 5 which are formed on or suitably secured to the body portion 4.

The spool illustrated in the drawings is designed for use in a fishing reel, and the ends thereof are provided with outwardly-extending axial projections or trunnions 6 and 7 by means of which the spool may be journaled in the reel structure.

The inner or opposing walls of the end flanges 5 are flared outwardly, and they are each provided with an outwardly-flared series of concentric, annular corrugations 8, each of which is undercut or has a surface 9 which extends toward the body of its flange 5 from a plane extending at right angles to the turning axis of the spool, which is the longitudinal axis of the body portion 4 thereof. The corrugations 8 cover or substantially cover the entire inner walls of the flanges 5, and they are adapted to be engaged by the line or thread which is wound upon the spool.

I have discovered that when the flanges 5 of a spool are provided with the undercut corrugations 8, having the surfaces 9, that it will be impossible for layers of a line being wound upon the spool to build upon one another and subsequently collapse and tangle the line, because the under cut corrugations 8, while permitting certain of the coils to rest therein, will shed the other coils down or inwardly toward the body portion 4 of the spool as rapidly as they attempt to build upon one another in single layers.

Figure 4:
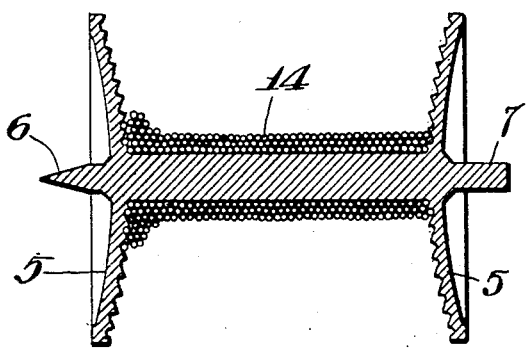
Fig. 4 is a view like Fig. 3, including a number of coils of a line or thread wound upon the spool.

In Fig. 4, I have shown a number of coils of a line 14 wound upon the spool; and, at the left hand end of the figure, I have shown the manner in which the coils will build upon one another if proper care is not taken to move the line back and forth to distribute it evenly over the body portion 4 of the spool while feeding it thereto during the winding operation.

I claim as my invention:—

1. A spool having a body portion and an end flange, the inner face of the flange being provided with a series of under cut corrugations, and each corrugation having a surface which extends toward the axis of the spool and toward the body of the flange from a plane extending at right angles to the turning axis of the spool.

2. A spool having a body portion and an outwardly-flared end flange, the inner face of the flange being provided with an outwardly-flared series of undercut corrugations, and each corrugation having a surface which extends toward the axis of the spool and toward the body of the flange from a plane extending at right angles to the turning axis of the spool.

3. A spool having a body portion and an end flange, the inner face of the flange being provided with a series of concentric, annular under cut corrugations, and each corrugation having a surface which extends toward the axis of the spool and toward the body of the flange from a plane extending at right angles to the turning axis of the spool.

4. A spool having a body portion and an end flange, the inner face of the flange being provided with an outwardly-flared series of concentric, annular under cut corrugations, and each corrugation having a surface which extends toward the axis of the spool and toward the body of the flange from a plane extending at right angles to the turning axis of the spool.

In testimony whereof I affix my signature hereto.

DAVID F. VAUGHAN.